Sept. 7, 1954   W. H. NEWELL   2,688,724
MAGNETIC AMPLIFIER
Filed April 27, 1951
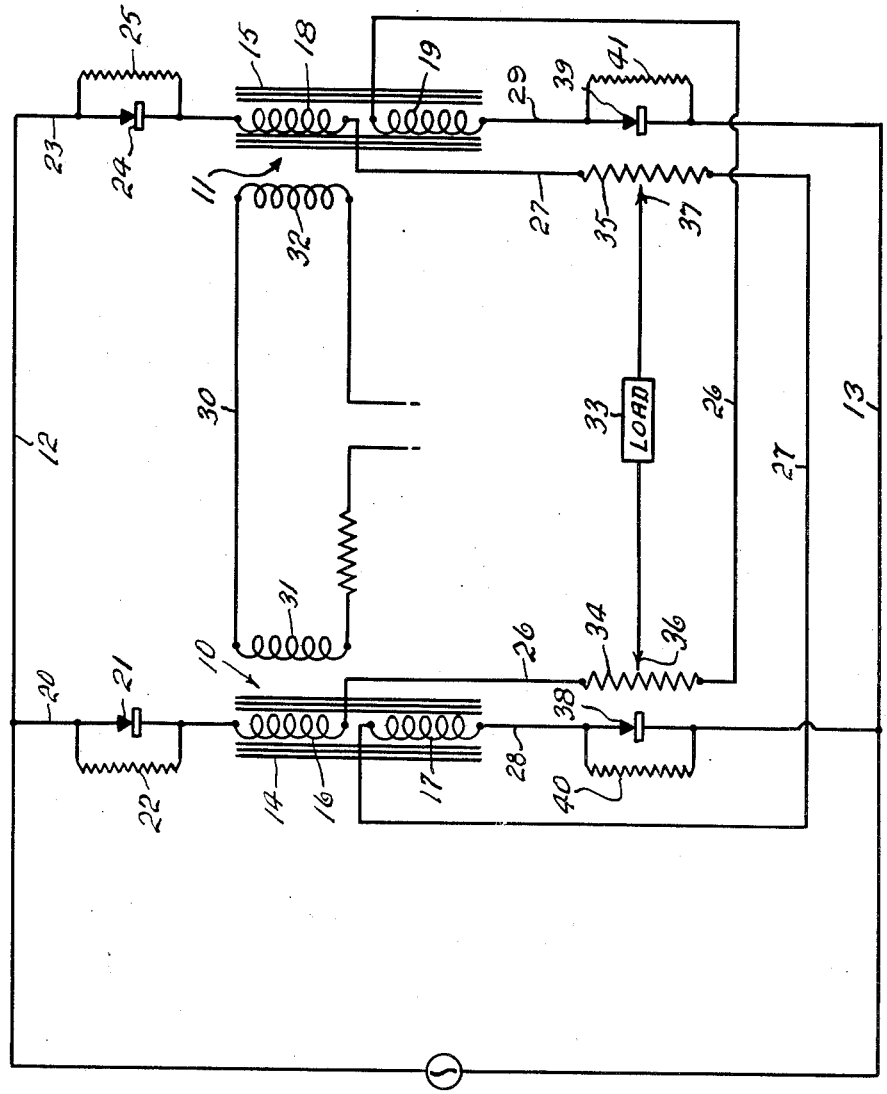
INVENTOR.
William H. Newell
BY Victor D. Borst
Atty.

Patented Sept. 7, 1954

2,688,724

UNITED STATES PATENT OFFICE 2,688,724

MAGNETIC AMPLIFIER

William H. Newell, Mount Vernon, N. Y., assignor to The Sperry Corporation, a corporation of Delaware Application April 27, 1951, Serial No. 223,270

4 Claims. (Cl. 323—89)

This invention relates to magnetic amplifiers of the saturable core reactor type and is a modification of the magnetic amplifier of the copending application of Henry F. McKenney and Henry Kaplan, Serial No. 218,490, filed March 30, 1951.

These magnetic amplifiers are characterized by the fact that two reactors are connected in parallel across the line in series with similarly poled half wave rectifiers, so that they are both pulsed by the same half wave, and the control current which governs the saturation of the reactor magnetic circuits acts differentially or in a push-pull relation with respect to the reactor windings. A load circuit which is connected across the output leads of the two reactors thus has a difference in potential at its connections when there is a control current.

In the circuit of the said pending application, there is a resistor in the output lead of each reactor beyond the connection of the load circuit, with a resultant power loss. In accordance with the present invention the voltage drop between the load circuit connection and the other side of the supply line is utilized in a reactor winding and in this way power loss in resistors is avoided and the voltage of the load circuit is substantially increased for a given control current.

Specifically this is effected in the present invention by using split reactor windings and connecting one part of each winding in series with a part of the other winding.

With no control current, there will in theory be no difference in voltage at the load circuit connections to the reactor output leads, but practically the difference in iron characteristics of the cores may cause a slight difference in voltage. The invention contemplates compensating for this by using variable resistor connections with the output leads.

The drawing illustrates diagrammatically a circuit arrangement embodying the invention.

Two reactors 10 and 11 are connected in parallel across the two sides 12 and 13 of an alternating current line. The reactors have laminated cores 14 and 15, respectively, which form closed magnetic circuits, with the reactor windings on the cores in the usual manner.

As above stated and as shown, each reactor winding is a two-part split winding, one part of each winding being connected in series with one part of the other winding, and the load being connected across the two series circuits between the two winding parts of each circuit.

As shown, the split winding of reactor 10 has the two parts 16 and 17 and the split winding of reactor 11 has the two parts 18 and 19. The winding parts 16 and 18 have corresponding ends connected to the side 12 of the power line and their other ends attached to leads connected to the load circuit. The winding part 16 is connected to the side 12 of the line by lead 20 in which is a half wave rectifier 21 with a resistor 22 connected in shunt therewith. The winding part 18 is connected to the side 12 by lead 23 in which is a half wave rectifier 24 having a resistor 25 in shunt therewith. The rectifiers 21 and 24 are similarly poled. Hence the windings are pulsed by the same half wave.

The load winding 16 is connected by lead 26 in series with the winding part 19 and the load winding 18 is connected by lead 27 in series with the winding part 17, the output leads 28 and 29, respectively of the winding parts 17 and 19 being connected to the other side 13 of the line.

The two parts of each reactor winding have their inputs connected to the same ends and they are similarly wound so as to induce flux in the same direction. The control circuit 30 has windings inductively disposed upon the cores so as to induce flux that will augment the reactance flux in one core and oppose that in the other. The core structure may, of course, be either two independent cores or may be a three legged core.

The drawing diagrammatically suggests two independent cores, in which case the control circuit has two windings 31, 32, one disposed on each of the cores 14 and 15 and wound thereon in opposition so as to have a push-pull effect.

A load circuit 33 is connected across the leads 26 and 27 in advance of the windings 19 and 17, respectively, the connections being through resistors 34 and 35 and slide contacts 36 and 37, respectively, for the purpose of obtaining zero load potential on null condition of the control current.

The leads 28 and 29 are shown as including rectifiers 38 and 39, respectively, each having a shunt resistor 40 and 41, respectively, the two rectifiers being similarly poled in the same direction as rectifiers 21 and 24. The purpose of rectifiers 38 and 39, as explained in the above mentioned copending application, is to avoid a closed circuit including the load and the windings 17 and 19 on the off half cycle. For example, if the magnetic amplifiers are cascaded, the load current is used as a control current for the next stage which is poled to use the alternate half cycle. If the load circuit were then closed, a current would be induced which would react upon the second stage reactor. One of the rectifiers 38, 39 blocks off the circuit which would otherwise be closed, for example, from the right side of the load through lead 27, coil 17, lead 28, conductor 13, lead 29, coil 19 and lead 26 to the other side of the load. In this direction rectifier 39 blocks the circuit.

It is understood that the particular arrangement illustrated and above described is but one embodiment of the invention as pointed out in the following claims.

What is claimed is:

1. A magnetic amplifier comprising a pair of closed magnetic circuits, two windings inductively disposed on each magnetic circuit, an alternating current line, two branch circuits connected in parallel across the line, each branch circuit including in series one winding of each magnetic circuit, a unidirectional conducting device in each branch circuit, said devices being poled in the same direction, and a load circuit connected across the branch circuits between the two winding parts of each branch and having a variable resistance connection with one of the branches.

2. A magnetic amplifier comprising a pair of closed magnetic circuits, two windings inductively disposed on each magnetic circuit, an alternating current line, two branch circuits connected in parallel across the line, each branch circuit including in series one winding of each magnetic circuit, a unidirectional conducting device in each branch circuit, said devices being poled in the same direction, a series resistor in each branch circuit between the two winding parts, and a load circuit connected across the branch circuits at the said resistors by means of adjustable resistor contacts.

3. A magnetic amplifier comprising a pair of closed magnetic circuits, two windings inductively disposed on each magnetic circuit, an alternating current line, two branch circuits connected in parallel across the line, each branch circuit including in series one winding of each magnetic circuit, a unidirectional conducting device in each branch circuit, said devices being poled in the same direction, a load circuit connected across the branch circuits between the two winding parts of each branch, and a control winding on the core structure arranged in push-pull relation to the two magnetic circuits.

4. A magnetic amplifier comprising a pair of closed magnetic circuits, two windings inductively disposed on each magnetic circuit, an alternating current line, two branch circuits connected in parallel across the line, each branch circuit including in series one winding of each magnetic circuit, a unidirectional conducting device in each branch circuit, said devices being poled in the same direction, a series resistor in each branch circuit between the two winding parts, a load circuit connected across the branch circuits at the said resistors by means of adjustable resistor contacts, and a control winding on the core structure arranged in push-pull relation to the two magnetic circuits.

References Cited in the file of this patent

UNITED STATES PATENTS

| Number | Name | Date |
|---|---|---|
| 2,456,938 | Harder | Dec. 21, 1948 |
| 2,482,101 | Cooper | Sept. 20, 1949 |
| 2,509,738 | Ford | May 30, 1950 |

OTHER REFERENCES

The Transductor Amplifier (Krabbe), published by Lindhska Boktryckeriet, Orebro, Sweden, 1947 (page 29 relied on).